US011327938B2

(12) United States Patent
Jose et al.

(10) Patent No.: US 11,327,938 B2
(45) Date of Patent: May 10, 2022

(54) METHOD TO IMPROVE PREDICTION ACCURACY OF BUSINESS DATA WITH ENHANCED DATA FILTERING AND DATA REDUCTION MECHANISM

(71) Applicant: SAP SE, Walldorf (DE)

(72) Inventors: Aby Jose, Kottayam (IN); Sagar Madivalar, Hubli (IN)

(73) Assignee: SAP SE, Walldorf (DE)

( * ) Notice: Subject to any disclaimer, the term of this patent is extended or adjusted under 35 U.S.C. 154(b) by 319 days.

(21) Appl. No.: 16/691,974

(22) Filed: Nov. 22, 2019

(65) Prior Publication Data
US 2021/0157780 A1 May 27, 2021

(51) Int. Cl.
| | |
|---|---|
| *G06F 16/00* | (2019.01) |
| *G06F 16/22* | (2019.01) |
| *G06N 5/04* | (2006.01) |
| *G06F 16/23* | (2019.01) |
| *G06F 40/30* | (2020.01) |
| *G06F 40/242* | (2020.01) |
| *G06Q 10/06* | (2012.01) |

(52) U.S. Cl.
CPC ...... *G06F 16/2228* (2019.01); *G06F 16/2379* (2019.01); *G06F 40/242* (2020.01); *G06F 40/30* (2020.01); *G06N 5/04* (2013.01); *G06Q 10/063* (2013.01)

(58) Field of Classification Search
CPC .. G06F 16/2228; G06F 16/379; G06F 40/242; G06F 40/30; G06F 16/2379; G06Q 10/063; G06N 5/04
See application file for complete search history.

(56) References Cited

U.S. PATENT DOCUMENTS

| | | | | |
|---|---|---|---|---|
| 6,775,664 | B2 * | 8/2004 | Lang | G06F 16/30 707/999.002 |
| 9,280,610 | B2 * | 3/2016 | Gruber | G06F 16/9535 |
| 9,489,379 | B1 * | 11/2016 | Wu | G06F 16/2308 |
| 2002/0120609 | A1 * | 8/2002 | Lang | G06F 16/337 |
| 2016/0170742 | A1 * | 6/2016 | Pallath | G06F 8/33 717/120 |
| 2016/0364648 | A1 * | 12/2016 | Du | G06N 20/00 |
| 2018/0025303 | A1 * | 1/2018 | Janz | G16H 10/20 705/2 |
| 2018/0174059 | A1 * | 6/2018 | Banerjee | G06N 5/025 |
| 2019/0086903 | A1 * | 3/2019 | Ochiai | G05B 23/0208 |

(Continued)

*Primary Examiner* — Leslie Wong
(74) *Attorney, Agent, or Firm* — Buckley, Maschoff & Talwalkar LLC

(57) ABSTRACT

According to some embodiments, a system associated with predictive analytics may include a data filter dictionary that stores a plurality of electronic data records based on prior input data. A data filtering and noise reduction module may receive input data and access the data filter dictionary. The data filtering and noise reduction module may then utilize data from the data filter dictionary and a latent semantic indexing data filter and noise reduction algorithm to remove information from the input data and create a subset of the input data. A predictive analytic algorithm platform may receive the subset of input data and use a predictive analytic algorithm to output a prediction result. An intelligent loop-back mechanism may then receive the subset of the input data and dynamically update the data filter dictionary based on an impact associated with the output prediction result.

18 Claims, 13 Drawing Sheets

(56) References Cited

U.S. PATENT DOCUMENTS

| | | | |
|---|---|---|---|
| 2020/0210817 A1* | 7/2020 | Chatterjee | G06N 3/0481 |
| 2020/0273570 A1* | 8/2020 | Subramanian | G06N 7/005 |
| 2020/0322703 A1* | 10/2020 | Bures | G06F 16/27 |
| 2020/0358781 A1* | 11/2020 | Edwards | H04L 63/105 |
| 2020/0409951 A1* | 12/2020 | Kowolenko | G06F 40/284 |

* cited by examiner

METHOD TO IMPROVE PREDICTION ACCURACY OF BUSINESS DATA WITH ENHANCED DATA FILTERING AND DATA REDUCTION MECHANISM

BACKGROUND

An enterprise may want to run a predictive analytics algorithm to make a prediction. For example, an enterprise might want to predict when a database may fail, or the occurrence of any other event, based on a set of input data. Predictive analytics algorithms, however, can consume substantial amounts of time and/or computing resources (e.g., memory, processing power, etc.) especially when there is a significant amount of input data (e.g., input documents, table records, natural language information, etc.). It would therefore be desirable to provide improved and efficient predictions, such as those associated with a predictive analytics system, in a fast, automatic, and accurate manner.

SUMMARY

According to some embodiments, a system associated with predictive analytics may include a data filter dictionary that stores a plurality of electronic data records based on prior input data. A data filtering and noise reduction module may receive input data and access the data filter dictionary. The data filtering and noise reduction module may then utilize data from the data filter dictionary and a latent semantic indexing data filter and noise reduction algorithm to remove information from the input data and create a subset of the input data. A predictive analytic algorithm platform may receive the subset of input data and use a predictive analytic algorithm to output a prediction result. An intelligent loop-back mechanism may then receive the subset of the input data and dynamically update the data filter dictionary based on an impact associated with the output prediction result.

Some embodiments comprise: means for receiving input data at a computer processor of a data filtering and noise reduction module; means for accessing a data filter dictionary, wherein the data filter dictionary stores a plurality of electronic data records associated with prior input data; means for utilizing data from the data filter dictionary and a latent semantic indexing data filter and noise reduction algorithm to remove information from the input data and create a subset of the input data; means for receiving the subset of the input data at a predictive analytic algorithm platform; means for using, by the predictive analytic algorithm platform, a predictive analytic algorithm and the subset of the input data to output a prediction result; means for receiving, at an intelligent loop-back mechanism, the subset of the input data; and means for dynamically updating, by the intelligent loop-back mechanism, the data filter dictionary based on an impact associated with the output prediction result.

Some technical advantages of some embodiments disclosed herein are systems and methods to provide improved and efficient predictions for a predictive analytics system in a fast, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
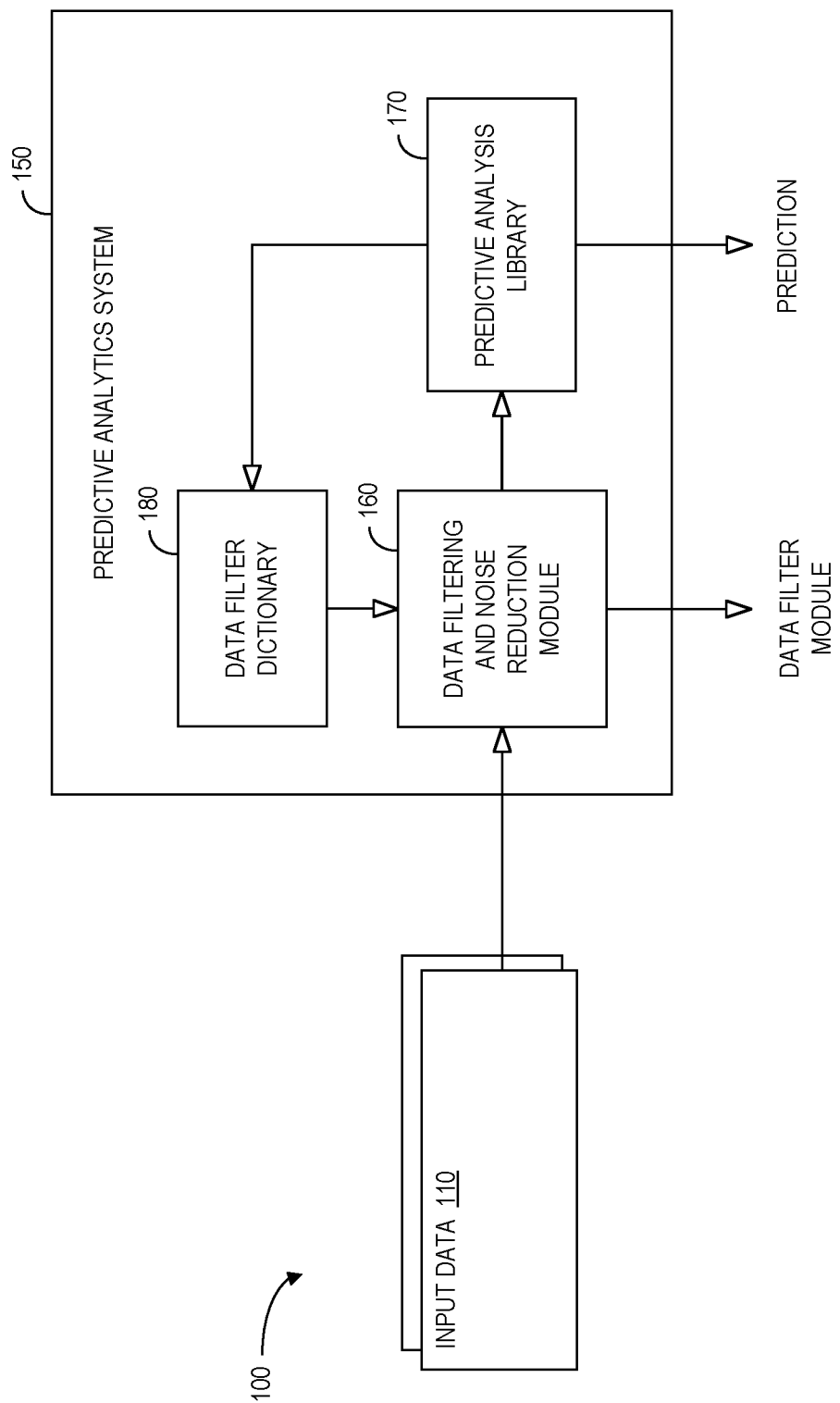
FIG. 1 is a high-level system architecture in accordance with some embodiments.

To provide improved and efficient predictions for a predictive analytics system in a fast, automatic, and accurate manner, FIG. 1 is a high-level system 100 architecture in accordance with some embodiments. The system 100 includes a predictive analytics system 150 that receives input data (e.g., documents). As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The predictive analytics system 150 may store information into and/or retrieve information from various data stores, which may be locally stored or reside remote from the predictive analytics system 150. Although a single predictive analytics system 150 is shown in FIG. 1, any number of such devices may be included. Moreover, various devices described herein might be combined according to embodiments of the present invention. For example, in some embodiments, the predictive analytics system 150 and data filter module might comprise a single apparatus. The system 100 functions may be automated and/or performed by a constellation of networked apparatuses, such as in a distributed processing or cloud-based architecture. As used herein, the term "automated" may refer to any process or method that may be performed with little or no human intervention.

An operator, administrator, or enterprise application may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated prediction results (e.g., reports) from the system 100.

The input data 110 may be processed by a data filtering and noise reduction module 160 before being passed to a predictive analysis library 170 that generates the prediction of the predictive analytics system 150. The predictive analysis library 170 also provides information to a data filter dictionary 180 (which, in turn, feeds information to the data filtering and noise reduction module 160. As will be explained, such a system 100 may provide an efficient method for data filtering and noise reduction in the predictive analysis system 150 (e.g., in connection with a HANA® in-memory database system available from SAP®) which works in conjunction with the predictive analysis library 170.

Some embodiments may re-use an existing data reduction algorithm referred to as Latent Semantic Indexing ("LSI") with an adjustment that makes the algorithm dynamic and/or self-learning. Note that each table record in a set of input data 110 might be considered a document with respect to the LSI algorithm.

Some embodiments may utilize a loop-back mechanism where the output of the data filtering and noise reduction module 160 becomes an input for prediction algorithms in the predictive analysis library 170 and "noise" (records which do not have an impact on prediction) is removed during each prediction cycle as the system optimizes the data filter dictionary 180. This may help reduce prediction time and complexity as the noise data gets filtered out from the input data 110 (just before the prediction process is performed). Note that other types of data filtering for the LSI algorithm are static in nature and do not improve over time. According to some embodiments described herein, the data filtering and noise reduction module is instead dynamic and capable of self-learning.

The system 100 may be used to make any type of prediction, including business data optimization predictions for an enterprise. In one example, the input data 110 is associated with database logs (e.g., which typically contain descriptive labels) and the prediction comprises a database failure prediction. Note that failure prediction in cloud systems and/or services may help organizations and teams identify potential future failures to take preventive maintenance actions. In some cases, organizations use Machine Learning ("ML") based predictive algorithms to predict cloud failures. These ML algorithms often use data such as log files, health check alerts, etc. as input for the predictions. The ML algorithm (e.g., a Support Vector Machine ("SVM")) might use the input data to extract relevant features. Later, the algorithms undergo a training process to develop trained models which are used to make the predictions.

Using ML algorithms directly, however, may require specific skill-sets and is a time-consuming process. According to some embodiments, the predictive analytics may include in-built implementations of predictive analytic algorithms. The implementations of these algorithms already exist as part of in-memory system and may be relatively easy to consume by end users. Moreover, developers may reuse these algorithms without substantial effort.

In many cases, a substantial amount of the test data (input data 110) consists of noise (in this context, the term "noise" may refer to records that don't have a substantial impact on predictions). This noise data can reduce the performance of the predictive analytic algorithm (e.g., introducing increased prediction time and complexity).

Figure 2:
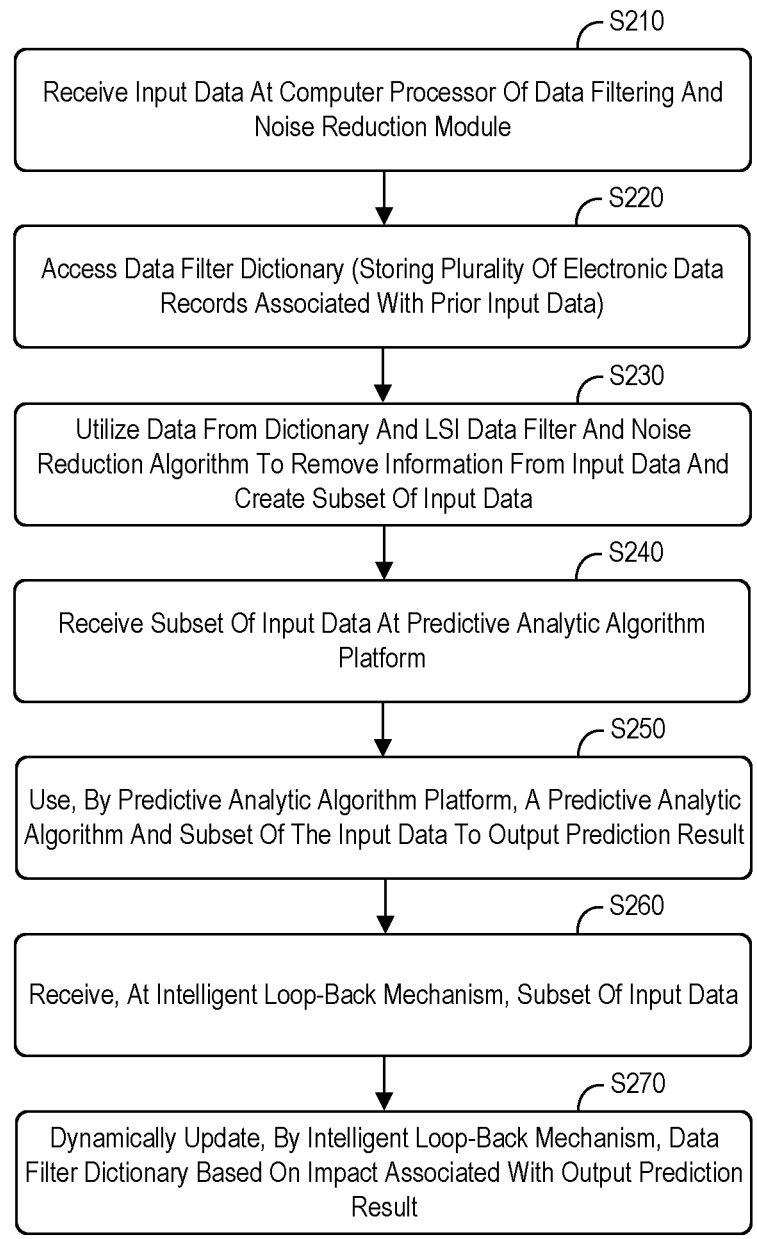
FIG. 2 is a method according to some embodiments.

FIG. 2 is a method that might be performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, the system may receive input data at a computer processor of a data filtering and noise reduction module. According to some embodiments, the input data might be a set of documents, a set of table records, unstructured data, Natural Language Processing ("NLP") information, etc. At S220, the system may access a data filter dictionary. The data filter dictionary may, according to some embodiments, store a plurality of electronic data records associated with prior input data. At S230, the system may utilize data from the data filter dictionary and a Latent Semantic Indexing ("LSI") data filter and noise reduction algorithm to remove information from the input data and create a subset of the input data. According to some embodiments, the predictive analytic algorithm is associated with any type of business data optimization and/or a predictive analysis library.

At S240, the system may receive the subset of the input data at a predictive analytic algorithm platform. At S250, the predictive analytic algorithm platform may use a predictive analytic algorithm and the subset of the input data to output a prediction result. At S260, an intelligent loop-back mechanism may receive the subset of the input data and dynamically update the data filter dictionary based on an impact associated with the output prediction result at S270.

Figure 3:
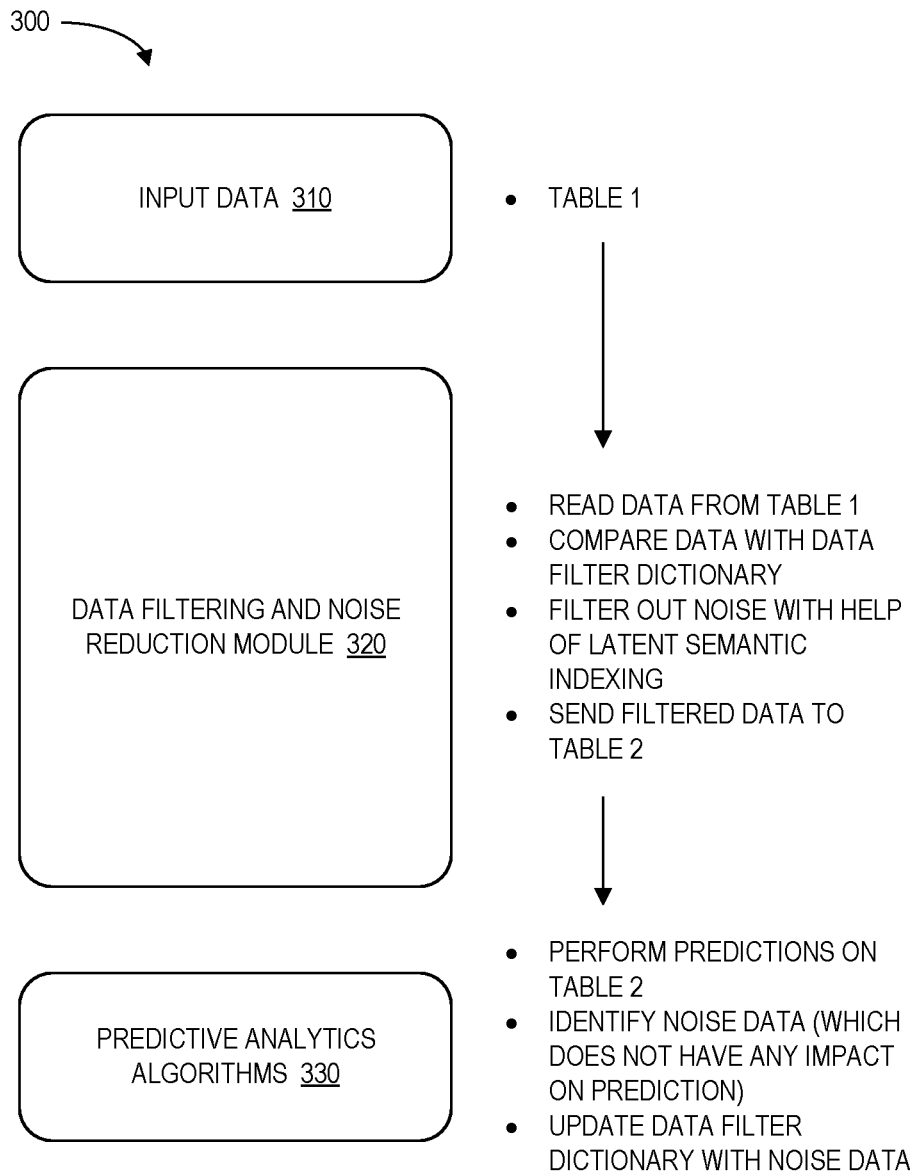
FIG. 3 is an information flow diagram in accordance with some embodiments.

FIG. 3 is an information flow diagram 300 in accordance with some embodiments. In particular, input data 310 (stored as table 1) is processed by a data filtering and noise reduction module 320 before being passed (via table 2) to predictive analytics algorithms 330. The data filtering and noise reduction module 320 uses a "data filter dictionary" (which is empty during the first run) that consists of the details of noise records (records that don't have an impact on prediction). The module 320 reads the input data 310 from table 1, compares that data with the data filter dictionary, ands filters out noise with the help of the LSI algorithm. The filtered data is stored into table 2. The predictive analytics algorithms 330 then performs predictions on table 2, identifies the noise data after each prediction, and updates the data filter dictionary with noise data. In this way, the method introduces a loop-back mechanism where the output of the predictive analytics algorithms 330 supplies input to the data filtering and noise reduction module 320 (and, in some embodiments, also the other way). Hence both modules may work in conjunction, complement each other, and help reduce the time and/or complexity of predictions for the enterprise.

Figure 4:
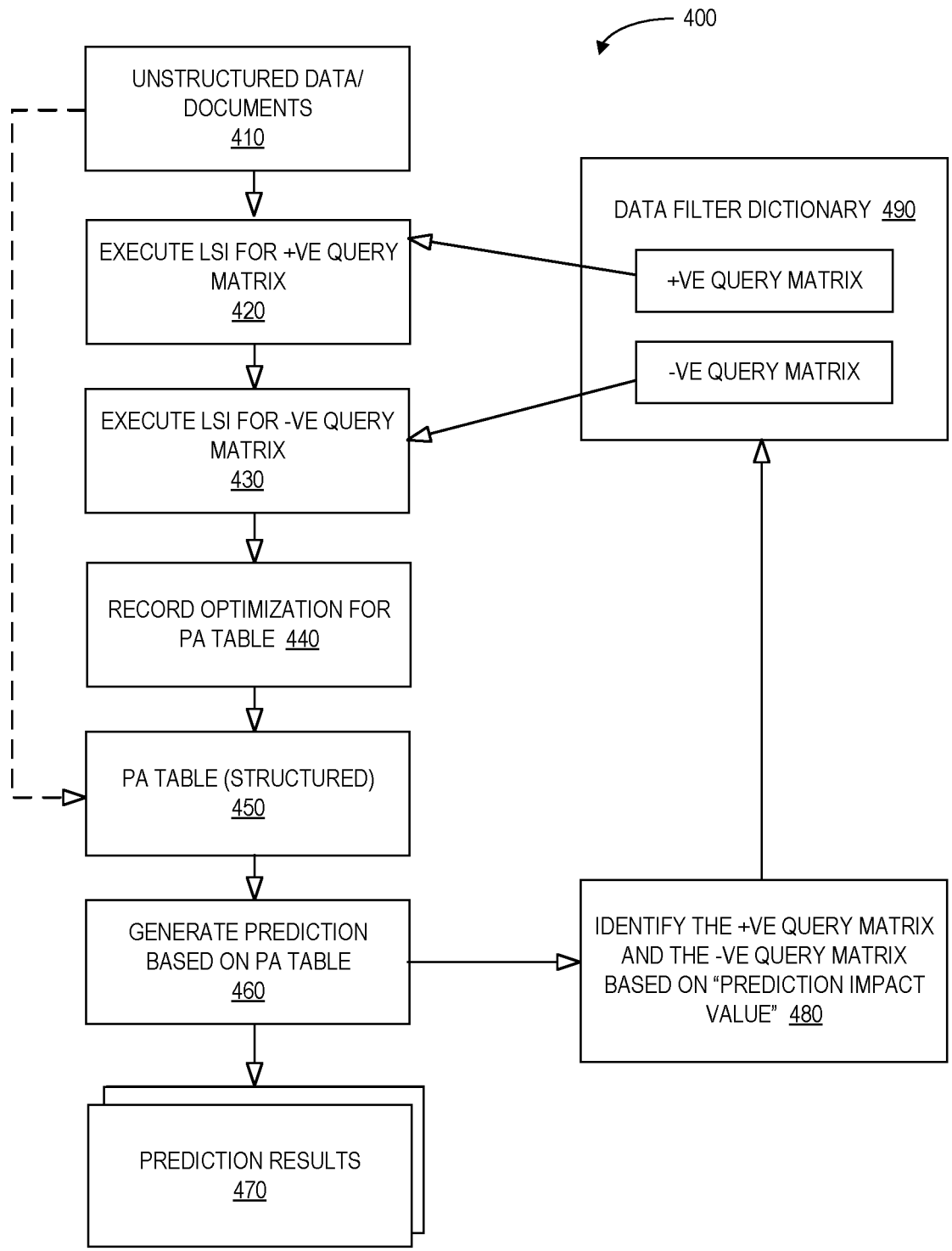
FIG. 4 is a detailed process flow diagram in accordance with some embodiments.

FIG. 4 is a more detailed process flow diagram 500 in accordance with some embodiments. Some of the components include:

- a data filter dictionary that gets updated with noise records in each prediction cycle;
- noise reduction with the help of an LSI algorithm (where LSI becomes dynamic and gets optimized after each iteration); and
- library-based prediction that also update the data filter dictionary with the latest noise details.

At 410, unstructured data and/or documents (table 1) are accessed by the system. As illustrated by the dashed line in FIG. 4, steps 420, 430, 440 are skipped during the first pass through the process diagram 400 (because the data filter dictionary 490 is empty). Note that LSI may require relatively high computational performance and memory in comparison to other information retrieval techniques. Real-world applications involving more than 30 million documents that were fully processed through the matrix and Singular Value Decomposition ("SVD") computations may be performed by some LSI applications. LSI can make it difficult to determine the optimal number of dimensions to use for performing the SVD. As a general rule, fewer dimensions allow for broader comparisons of the concepts contained in a collection of text, while a higher number of dimensions enable more specific (or more relevant) comparisons of concepts. The actual number of dimensions that can be used may be limited by the number of documents in the collection. When LSI topics are used as features in supervised learning methods, prediction error measurements may be used to find the ideal dimensionality. Further note that current implementations of LSI are static in nature. Also, the number of records/documents that LSI may need to deal with can be substantial. Hence, the scalability and performance associated LSI can be a challenge.

At 450, a structured Predictive Analytics ("PA") table (table 2) is updated and used to generate predictions at 460 and output prediction results at 470. Note that table 2 is the same as table 1 for the first run. At 480, a module may identify records based on a prediction impact value. Based on this, the module may create two sets of query matrices known as positive ("+ve") query matrix and negative ("−ve") query matrix (which are used later as inputs for LSI calculation).

In particular, at 480 the system may calculate the prediction impact value for each record in table 2. This is calculated based on the impact of each record toward the prediction results. With the help of predictive analytics algorithm, the module may calculate the prediction value (probability) by executing the complete set of table 2 records. Then, embodiments may eliminate one-by-one each record and re-calculate the prediction. If there is no impact, that particular record can be considered as "cold" (there is no impact on the prediction for the given problem statement). The below algorithm explains the steps applied at 480.

```
{
Step 1: Apply predictive algorithm on all the records present in PA table (table 2)
1.1) Array [records] X[ ] = PA Table
        //Perform predictive algorithm on PA table records
1.2) PredictionResult R = Execute "PA(X)"
Step 2: For Each record x1 in X {
        //Exclude the record x1 and perform PA again (i.e., PA(X − x1))
        2.1) PredictionResult R1 = Execute "PA"(X − x1)
        // Check if the record r1 is having any impact on Prediction
        2.2) If (R == R1) // R1 has no impact on prediction for the given problem
                {
                        Mark the Record x1 for Deletion
                        Insert x1 into QryNegative[ ]
                } else{
                        Insert x1 into QryPositive[ ]
                }
        //Calculates +ve query matrix & −ve query matrix for LSI
Step 3: Calculates Query matrices(+veQry & −veQry) // To be supplied to LSI later
        3.1) Calculates the Positive Query matrix based on the Array QryPositive
                +veQryMatrix = GetQryMatrix(QryPositive);
        3.2) Calculates the Negative Query matrix based on the Array QryNegative
                −veQryMatrix = GetQryMatrix(QryNegative);
        3.3) Eliminate duplicates from +veQryMatrix & −veQryMatrix (duplicate
entries don't have an impact on prediction and might lead to confusion).
}
Step 9: data filter dictionary 490 which holds "+veQryMatrix" and "−veQryMatrix" //
This will be supplied to LSI
Step 2, 3, and 4 get executed from second run onwards.
Step 2 executes LSI for +veQryMatrix and Step 3 executes LSI for −eQryMatrix
Input data is compared with the data filter dictionary 490 at 420. Noise is then fileted
out with the help of the LSI algorithm at 430.
Step 4 optimizes records for table 2 with the help of inputs from Step 2 & Step 3 as
explained below:
{
        <Input> :− LSI(+veQryMatrix), LSI(−veQryMatrix)
        For each record in table 1 //(each table record is a document for LSI)
        {
        If ( ( LSI(−veQryMatrix) > 0 ) && (LSI (+veQryMatrix)) == 0 )
        // Record has no impact and doesn't need be considered for prediction
        {
                Mark the record for deletion
```

```
        } else {
                Insert record into Array[Records] along with LSI(+ve) values
                // which will be the input for PAL
        }
}
// Now find out the Heatmap (relevance) based on LSI(+ve) values
Sort Array[Records] on LSI(+ve) descending
Insert Array[Records] into PA Table (table 2) // for analytic prediction
```

FIGS. 5 through 8 illustrates an example of documents processed according to some embodiments. Consider the following predictive analytics problem statement that might be associated with, for example, an in-memory database system: an automobile showroom wants to understand the probability of accidents caused by different categories of people who test drive cars. There is also a prerequisite that cars will be given for test drives only after verifying valid drivers' licenses.

Figure 5:
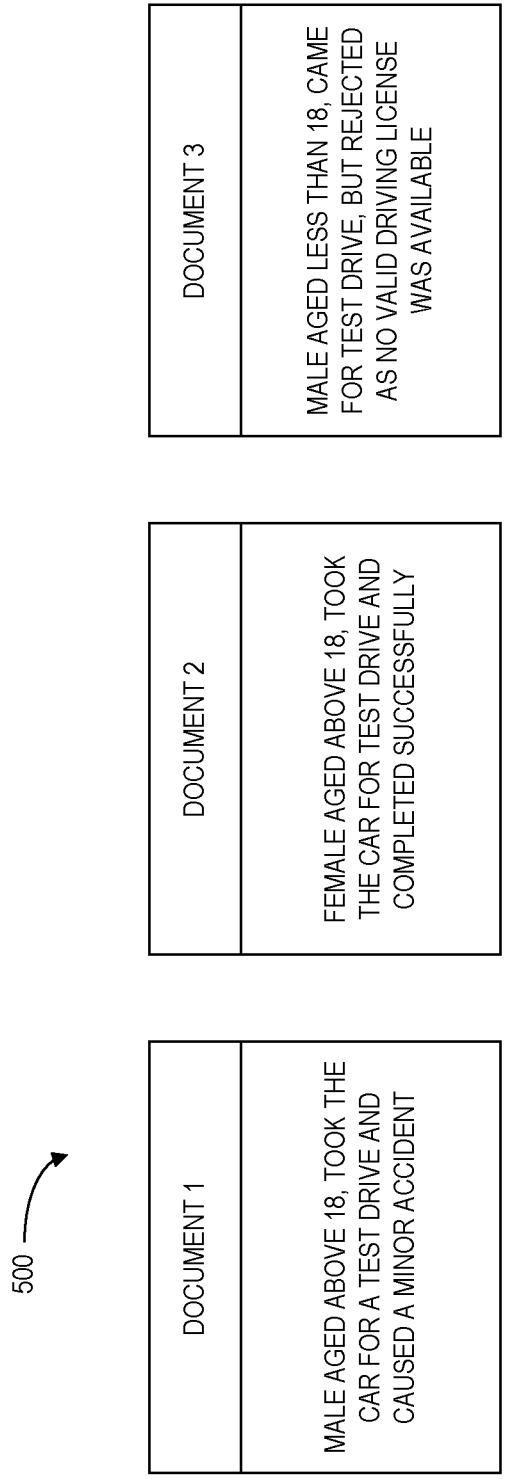
FIGS. 5 through 8 illustrate documents processed according to some embodiments.

The company observed the documents or records illustrated 500 in FIG. 5:
D1: male aged above 18, took the car for test drive and caused a minor accident;
D2: female aged above 18, took the car for test drive and completed successfully; and
D3: male aged less than 18, came for test drive, but rejected as no valid driving license was available.

During the first run, table 1 will include the following NLP data:
male aged above 18, took the car for test drive and caused a minor accident;
female aged above 18, took the car for test drive and completed successfully;
male aged less than 18, came for test drive, but rejected as no valid driving license was available.

Since there is no prior history during the first run, the next step is to establish table 2 to be the same as table 1. The prediction is made on table 2 and the system needs to determine the prediction impact of reach record. Suppose, for example, that documents D1 and D2 have an impact on the prediction results, but the impact value of D3 is zero (because the record is not a valid one for the given problem statement).

Figure 6:
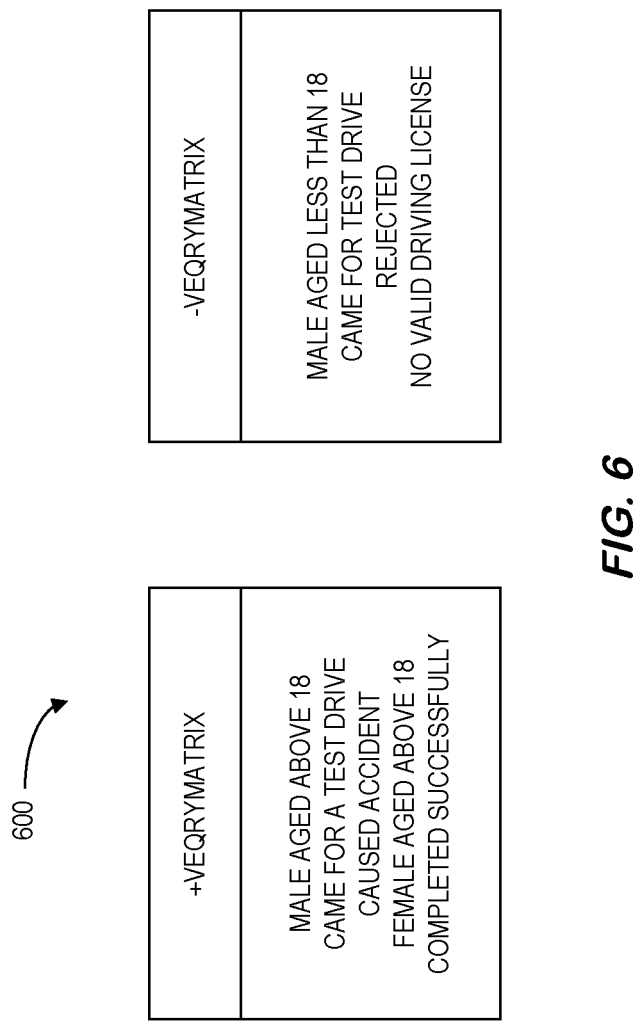

The system will then calculate +veQryMatrix and −veQryMatrix for the records. FIG. 6 illustrates 600 the content of the +veQryMatrix and the −veQryMatrix. After eliminating duplicates (e.g., "came for a test drive" is in both and thus will not have a meaningful impact):
+veQryMatrix={male aged above 18, caused accident, female aged above 18, completed successfully}
−veQryMatrix={male aged less than 18, rejected, no valid driving license}

Figure 7:
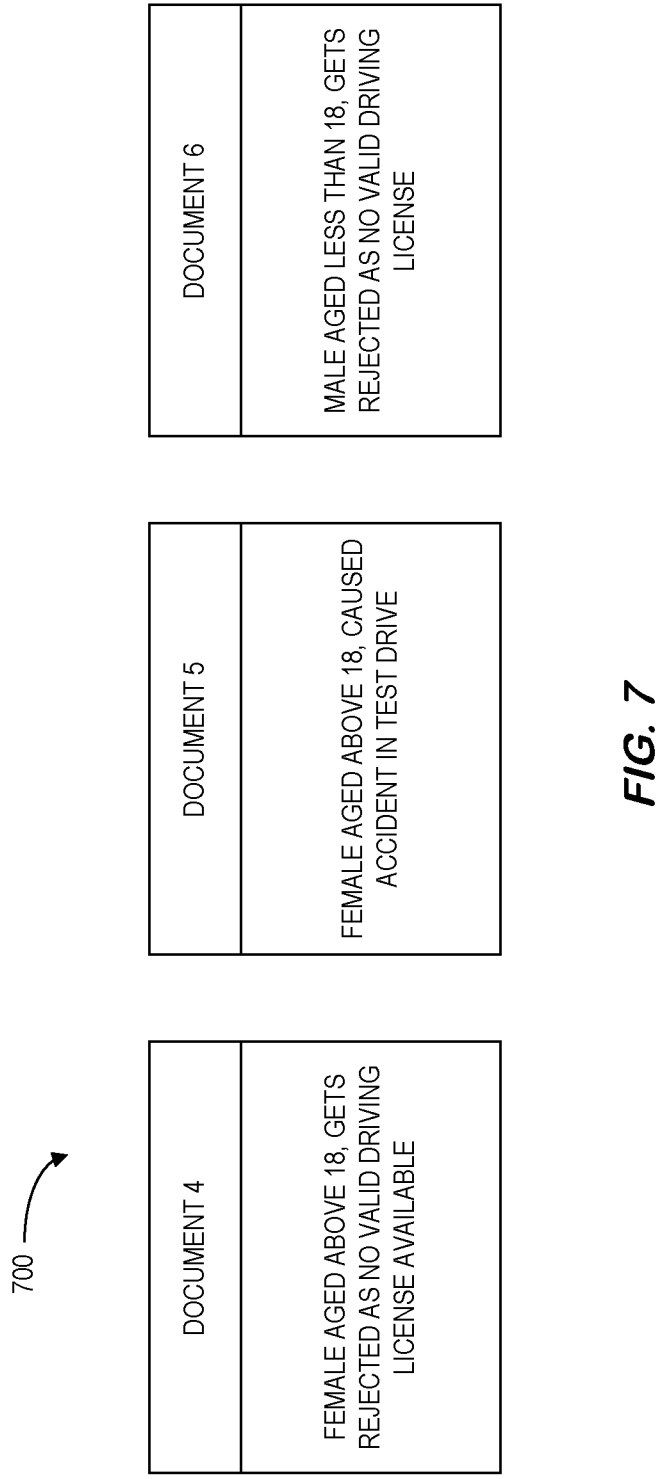

Now, for the second run, assume the system processes the three new documents illustrated 700 in FIG. 7.
D4: female aged above 18, gets rejected as no valid driving license available;
D5: female aged above 18, caused accident in test drive; and
D6: male aged less than 18, gets rejected as no valid driving license.

Figure 8:
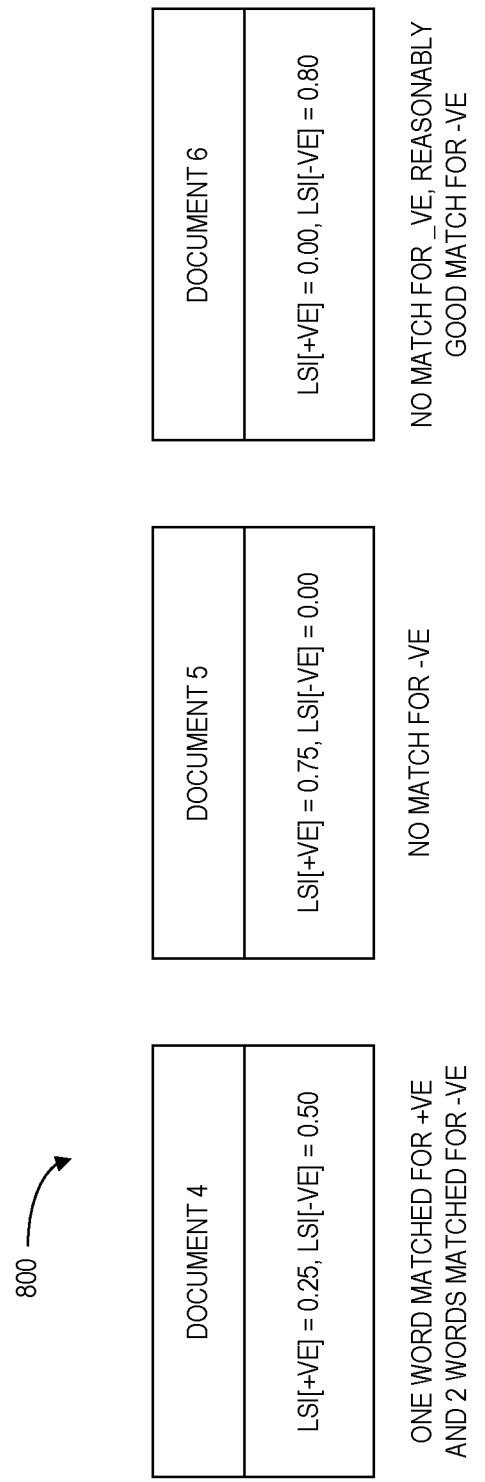

Now for the above records, the system may calculate the following example LSI values as illustrated 800 in FIG. 8 (not actual LSI values, but only for illustration):
D4: LSI[+ve]=0.25, LSI[−ve]=0.50//one-word matched for +ve and 2 words matched for −ve
D5: LSI[+ve]=0.75, LSI[−ve]=0.00//No match for −ve
D6: LSI[+ve]=0.00, LSI[−ve]=0.80//No match for +ve, but reasonably good match for −ve Note that document D6 will not be considered for the prediction because:
((LSI(−veQryMatrix)>0) && (LSI (+veQryMatrix))==0)

Note that document D4 also does not have an impact but will be considered for the second run because LSI[+ve]>0. Over a period of runs, the query matrices will become increasingly optimized, which will help the system easily exclude records which don't have an impact on predictions.

According to some embodiments, an LSI algorithm may look at patterns of word distribution (specifically, word co-occurrence) across a set of documents. Note that natural language is full of redundancies, and not every word that appears in a document carries semantic meaning. In fact, the most frequently used words in English are words that don't carry content at all: functional words, conjunctions, prepositions, auxiliary verbs, etc. Thus, LSI may remove extraneous words from a document, leaving only content words likely to have semantic meaning. There are many ways to define a content word such as:
make a complete list of all the words that appear anywhere in the collection;
Discard articles, prepositions, and conjunctions;
Discard common verbs (know, see, do, be, etc.);
Discard pronouns;
Discard common adjectives (big, late, high, etc.);
Discard frilly words (therefore, thus, however, albeit, etc.);
Discard any words that appear in every document; and
Discard any words that appear in only one document.

This process may condense documents into sets of content words that can then be used to index the input data.

Figure 9:
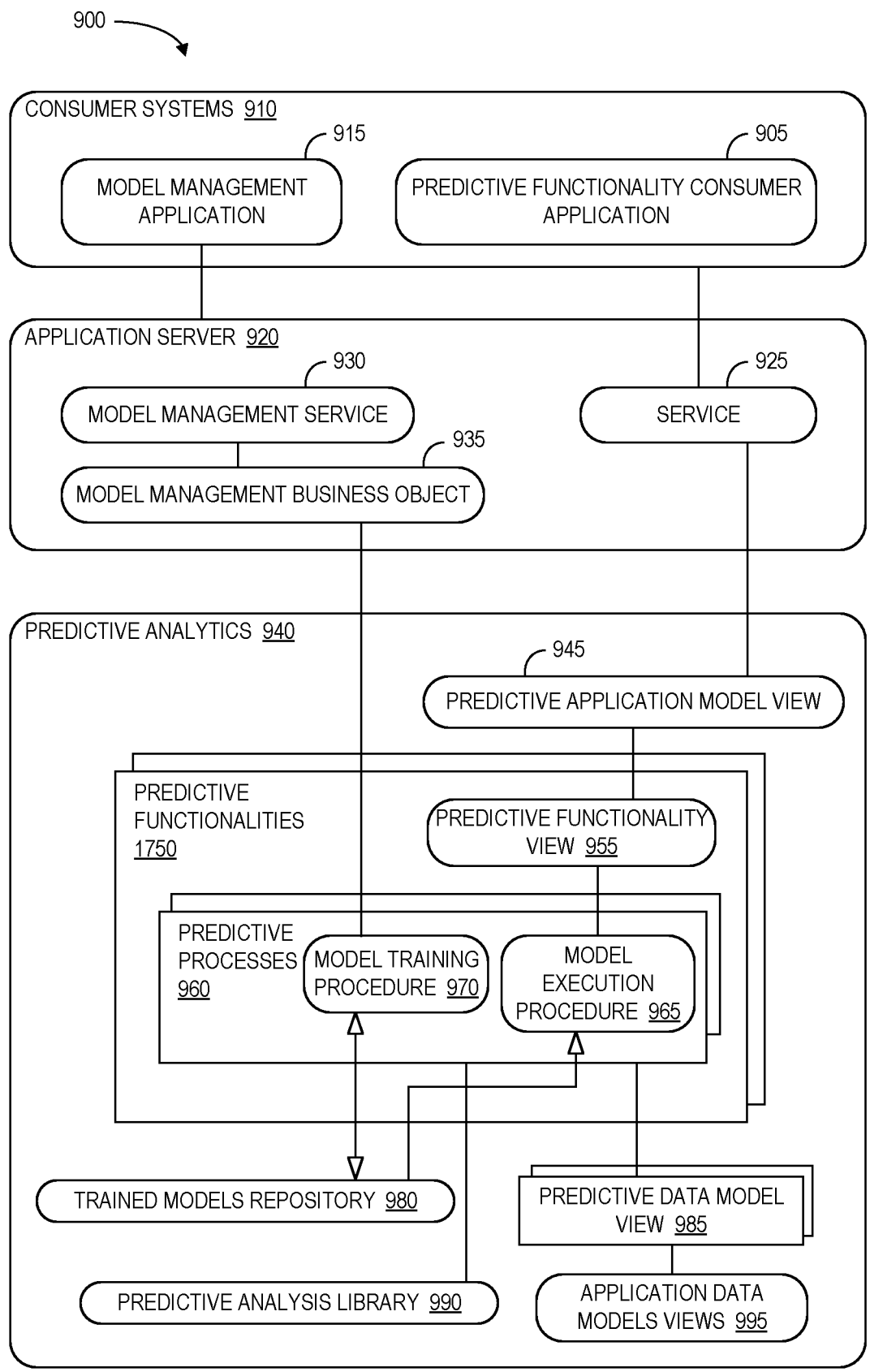
FIG. 9 illustrates an exemplary computer system of an application providing predictive functionality in accordance with some embodiments.

FIG. 9 illustrates an exemplary computer system 900 of an application providing predictive functionality in accordance with any of the embodiments described herein. One or more users, e.g., advanced analysts, business analysts, marketing experts, etc., operate on one or more consumer systems 910. Users may request predictive services via predictive functionality consumer application 905 or users may execute other operations related to management and processing of predictive models via model management application 915.

One or more consumer systems 910 access one or more predictive functionalities 950, calculated in and provided by predictive analytics 940, via services provided by application server 920. Consumer systems 910 may be reporting clients or other client applications built on exemplary technologies including, but not limited to, HTML5, ABAP, business objects-based technology such as SAP® BusinessObjects technologies, etc. In one embodiment, predictive analytics 940 is an in-memory database management system that employs a volatile storage. Predictive analytics 1040 may be based on column store architecture, e.g., SAP® HANA Database provided by SAP AG®. In various embodiments, the predictive analytics 940 includes computing engine that may maximize the use of the operative memory provided by modern hardware. Relevant data is kept in the operative memory where read operations can run. Such in-memory computing engine may also be designed to make use of multi core CPUs by parallelization of execution. The in-memory computing engine can be a hybrid system that reduces the complexity of programming models and system landscapes by combining different paradigms in one system. The in-memory computing engine may comprise engines for column-based, row-based, and object-based in-memory or volatile storage as well as traditional nonvolatile storage. These engines may be integrated in a way that, for example, data from row-based storage can be directly combined with data from column-based storage.

Predictive functionality consumer application 905 accesses, via service 925, predictive application model view 945. In turn, predictive application model view 945 accesses one or more predictive functionalities 950. Predictive application model 945 controls input data received from consumer systems 910 and result data provided by predictive functionality view 955. Predictive functionality view 955 provides real-time, predictive scores that are calculated in-memory. In one embodiment, predictive application model view 945 and predictive functionality view 955 may be predictive analytic views such as HANA views. At runtime these views, e.g., predictive application model 945 and predictive functionality 955 make use of optimized in-memory calculation engines of predictive analytics 940 and thus enable for high performance of calculations.

One predictive functionality from predictive functionalities 950 may be realized by different statistical and data mining algorithms, resulting in one or more predictive process implementations. For example, one or more predictive processes 960 may be implemented for a predictive functionality from predictive functionalities 950. Predictive functionality view 955 controls which predictive process to use from predictive processes 960, by checking an input parameter identifying the trained predictive model to be executed. At runtime, the input parameter identifying the trained predictive model is passed by predictive functionality consumer application 905 to predictive functionality view 955.

A predictive process from predictive processes 960 includes model execution procedure 965 and model training procedure 970. Model execution procedure 965 may be in-memory stored procedure applying an existing trained predictive model to data retrieved from predictive data model 985 to calculate a prediction such as scores of a key predictive indicator. In one embodiment, model execution procedure 965 and model training procedure 970 may be implemented by SQL, L or other script. Trained predictive models are stored in and retrieved from trained models repository 980. Model execution procedure 965 calls function provided by Predictive Analysis Library ("PAL") 990. In one embodiment, SAP AG® HANA PAL is used. PAL 990 defines functions that can be called from within SQL script procedures to perform analytic algorithms. PAL 990 includes universal predictive analysis algorithms in various data-mining categories including, but not limited to, clustering, classification, association, time series, social network analyses, etc. Alternative libraries to PAL 990 may be statistical libraries that are not natively implemented in HANA such as International and Statistic Library and R. In one embodiment, an advanced analyst creates predictive data model view 985 based on customer data or application data model views 995 such as CRM Business Master Data, CRM transactional data, ERP SD transactional data, etc.

In one embodiment, consuming one or more predictive functionalities 950 by predictive functionality consumer application 905 may be real-time. Execution of other operations related to management and processing of predictive models via model management application 915 may also be real-time. Model management application 915 accesses, via service 930 and based on model management business object 935, one or more predictive processes 960. In one embodiment, a business analyst selects a predictive process from predictive processes 960 via model management application 915 to trigger creation and training of a predictive model. Predictive models are trained by model training procedure 970 and, once trained, predictive models are stored in trained models repository 980 for consumption.

In one embodiment, an end user may initiate a business predictive process and request to consume a predictive KPI via predictive functionality consumer application 905. The end user may define a market to generate a target group. At runtime, upon defining the market a segmentation object that represents the target group is generated. The segmentation object may be linked to a segmentation profile selected by the end user, at runtime. The segmentation object is passed to predictive functionality view 955. Predictive functionality view 955 may determine a business object instance of a trained predictive model based on correspondence between the segmentation object and applicable scope associated with the trained predictive model.

Some of the elements of the computer system architecture 900 resemble the structure and functionality of software modules developed by SAP AG. However, other structures with similar functionalities could be found in software products developed by other vendors, as well. Alternative embodiments may utilize other kinds of computer system architectures.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as Application-Specific Integrated Circuits ("ASICs"), Programmable Logic Devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
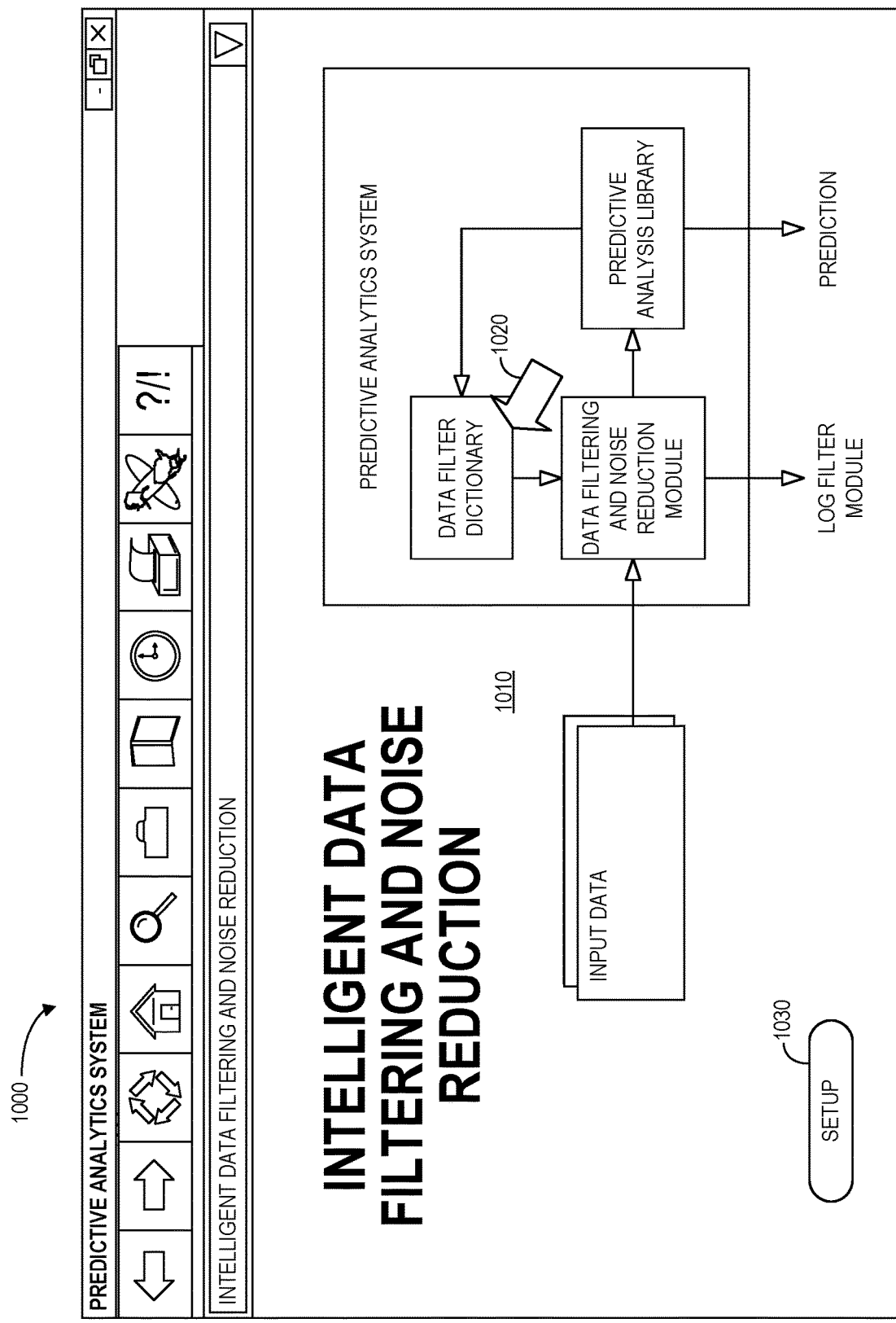
FIG. 10 is a human machine interface display according to some embodiments.

FIG. 10 is a human machine interface display 1000 in accordance with some embodiments. The display 1000 includes a graphical representation 1010 of elements of cloud-based computing environment (e.g., to efficiently update a data filter dictionary). Selection of an element (e.g., via a touch-screen or computer pointer 1020) may result in display of a pop-up window containing various options (e.g., to adjust rules or logic, assign various devices, etc.). The display 1000 may also include a user-selectable "Setup" icon 1030 (e.g., to configure parameters for predictions and/or adjust processes as described with respect any of the embodiments described herein).

Figure 11:
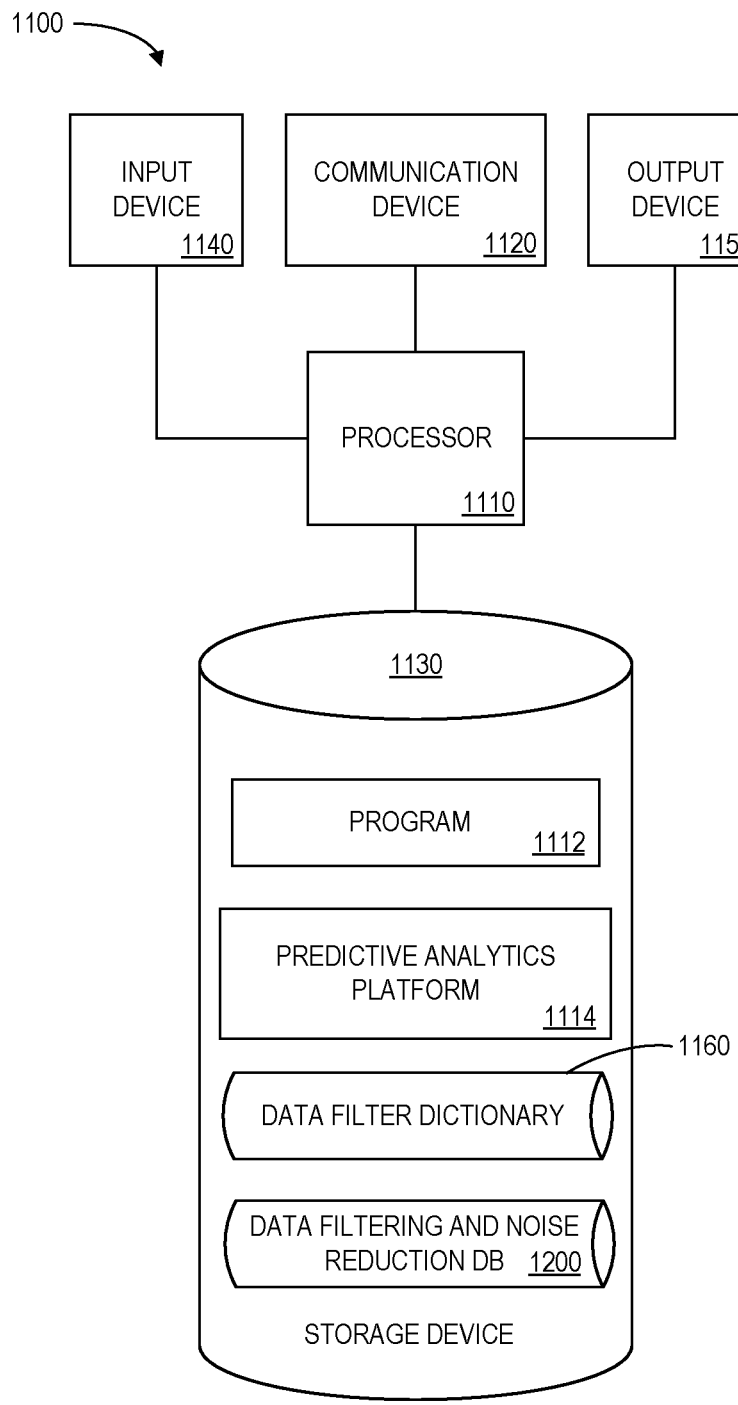
FIG. 11 is an apparatus or platform according to some embodiments.

Note that the embodiments described herein may be implemented using any number of different hardware configurations. For example, FIG. 11 is a block diagram of an apparatus or platform 1100 that may be, for example, associated with the system 100 of FIG. 1 (and/or any other system described herein). The platform 1100 comprises a processor 1110, such as one or more commercially available Central Processing Units ("CPUs") in the form of one-chip microprocessors, coupled to a communication device 1160 configured to communicate via a communication network (not shown in FIG. 11). The communication device 1160 may be used to communicate, for example, with one or more remote user platforms, cloud resource providers, etc. The platform 1100 further includes an input device 1140 (e.g., a computer mouse and/or keyboard to input rules or logic) and/an output device 1150 (e.g., a computer monitor to render a display, transmit predictions, and/or create recommendations). According to some embodiments, a mobile device and/or PC may be used to exchange information with the platform 1100.

The processor 1110 also communicates with a storage device 1130. The storage device 1130 can be implemented as a single database or the different components of the storage device 1130 can be distributed using multiple databases (that is, different deployment information storage options are possible). The storage device 1230 may comprise any appropriate information storage device, including combinations of magnetic storage devices (e.g., a hard disk drive), optical storage devices, mobile telephones, and/or semiconductor memory devices. The storage device 1130 stores a program 1112 and/or prediction analytics platform 1114 for controlling the processor 1110. The processor 1110 performs instructions of the programs 1112, 1114, and thereby operates in accordance with any of the embodiments described herein. For example, the processor 1110 may receive input data and access a data filter dictionary 1160. The processor 1110 may then utilize data from the data filter dictionary 1160 and an LSI data filter and noise reduction algorithm to remove information from input data and create a subset of the input data. The processor 1110 may receive the subset of input data and use a predictive analytic algorithm to output a prediction result. An intelligent loop-back mechanism may then receive the subset of the input data and dynamically update the data filter dictionary 1160 based on an impact associated with the output prediction result.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores the data filter dictionary 1160 and a data filtering and noise reduction database 1200. An example of a database that may be used in connection with the platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
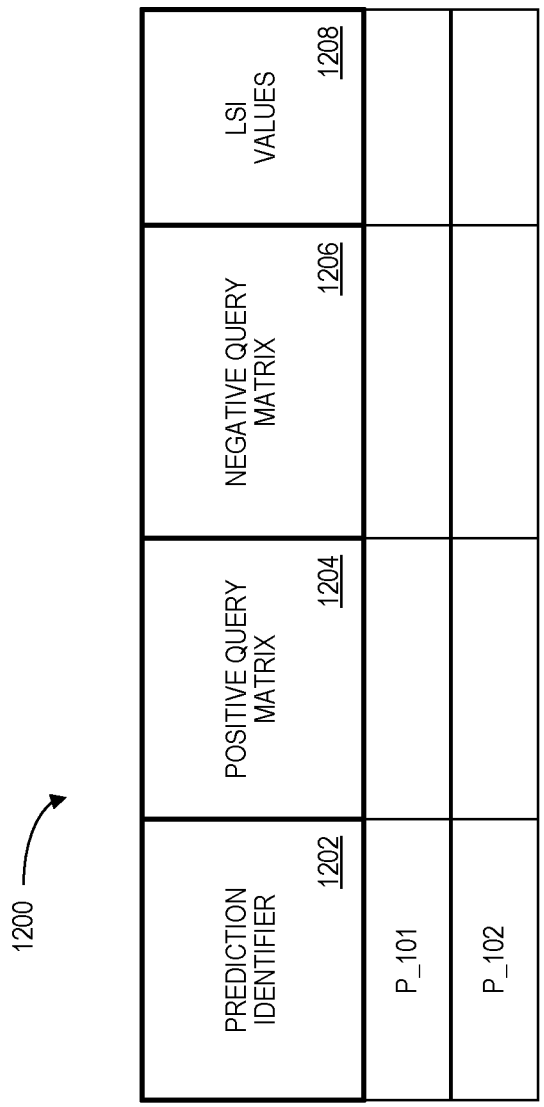
FIG. 12 illustrates a data filtering and noise reduction database in accordance with some embodiments.

Referring to FIG. 12, a table is shown that represents the data filtering and noise reduction database 1200 that may be stored at the platform 1100 according to some embodiments. The table may include, for example, entries identifying predictions made by the system. The table may also define fields 1202, 1204, 1206, 1208, for each of the entries. The fields 1202, 1204, 1206, 1208 may, according to some embodiments, specify: a prediction identifier 1202, a positive query matrix 1204, a negative query matrix 1206, and LSI values 1208. The data filtering and noise reduction database 1200 may be created and updated, for example, when new documents are received, predictions are made, etc.

The prediction identifier 1202 might be a unique alphanumeric label or link that is associated with a prediction that was made (or is being made) by the system and might include a requester application identifier, a date and time associated with the prediction request, etc. The positive and negative query matrix 1204, 1206 might indicate which words are likely (or unlikely) to impact predictions. The LSI values 1208 measures the impact of those words on the predictions.

Thus, embodiments may provide a data filtering and noise reduction module that may reduce the time and complexity of a prediction algorithm and thereby improve system performance. In the long run, some embodiments may increase prediction accuracy because the input data will include only the data that is relevant to the prediction.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
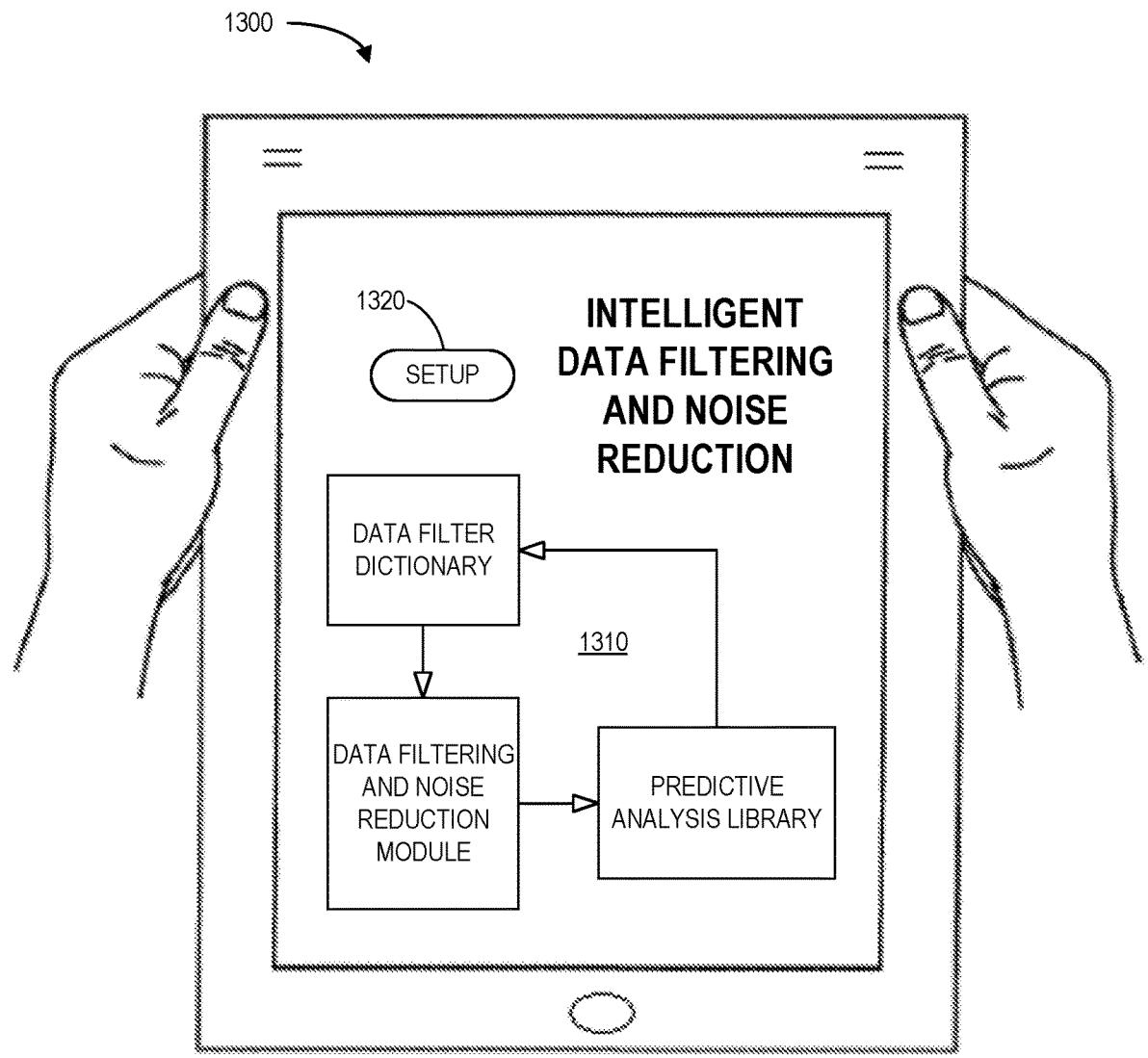
FIG. 13 illustrates a tablet computer according to some embodiments.

In some embodiments, cold data is simply discarded. In other embodiments, cold data may instead be moved into a third table to be re-considered after a specified number of predictions or a pre-determined period of time. Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 13 shows a tablet computer 1300 rendering predictive analytics system display 1310. The display 1310 may, according to some embodiments, be used to view more detailed elements about components of the system (e.g., when a graphical element is selected via a touchscreen) and/or to configure operation of the system (e.g., to establish new rules or logic for the system via a "Setup" icon 1320).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with predictive analytics, comprising:
   a data filter dictionary storing a plurality of electronic log data records associated with prior input data;
   a data filtering and noise reduction module, including:
      a computer processor, and
      a computer memory storage device, coupled to the computer processor, that contains instructions that when executed by the computer processor enable the data filtering and noise reduction module to:
      (i) receive input data,
      (ii) access the data filter dictionary, and
      (iii) utilize data from the data filter dictionary and a latent semantic indexing data filter and noise reduction algorithm to remove information from the input data and create a subset of the input data;
   a predictive analytic algorithm platform to receive the subset of input data and use a predictive analytic algorithm, associated with an in-memory database system and a predictive analysis library, to output a prediction result; and
   an intelligent loop-back mechanism to receive the subset of the input data and dynamically update the data filter dictionary based on an impact associated with the output prediction result.

2. The system of claim 1, wherein the input data is associated with at least one of: (i) a set of documents, (ii) a set of table records, (iii) unstructured data, and (iv) natural language processing information.

3. The system of claim 1, wherein the predictive analytic algorithm is to predict database failure.

4. The system of claim 1, wherein the latent semantic indexing data filter and noise reduction algorithm is associated with a positive query matrix and a negative query matrix.

5. The system of claim 4, wherein the subset of data of the input data created by the data filtering and noise reduction module comprises a structured prediction table.

6. The system of claim 5, wherein input data is removed if a latent semantic index value of the negative query matrix is greater than zero and a latent semantic index value of the positive query matrix is equal to zero.

7. The system of claim 1, wherein the input data comprises a set of documents and the latent semantic indexing is associated with at least one of: (i) a complete list of all words that appear in the input data, (ii) discarding articles, prepositions, and conjunctions, (iii) discarding common verbs, (iv) discarding pronouns, (v) discarding common adjectives, (vi) discarding frilly words, (vii) discarding any words that appear in every document, and (viii) discarding any words that appear in only one document.

8. A computer-implemented method associated with a predictive analytics system, comprising:
   receiving input data at a computer processor of a data filtering and noise reduction module;
   accessing a data filter dictionary, wherein the data filter dictionary stores a plurality of electronic log data records associated with prior input data;
   utilizing data from the data filter dictionary and a latent semantic indexing data filter and noise reduction algorithm to remove information from the input data and create a subset of the input data;
   receiving the subset of the input data at a predictive analytic algorithm platform;
   using, by the predictive analytic algorithm platform, a predictive analytic algorithm, associated with an in-memory database system and a predictive analysis library, and the subset of the input data to output a prediction result;
   receiving, at an intelligent loop-back mechanism, the subset of the input data; and
   dynamically updating, by the intelligent loop-back mechanism, the data filter dictionary based on an impact associated with the output prediction result.

9. The method of claim 8, wherein the input data is associated with at least one of: (i) a set of documents, (ii) a set of table records, (iii) unstructured data, and (iv) natural language processing information.

10. The method of claim 8, wherein the predictive analytic algorithm is to predict database failure.

11. The method of claim 8, wherein the latent semantic indexing data filter and noise reduction algorithm is associated with a positive query matrix and a negative query matrix.

12. The method of claim 11, wherein the subset of data of the input data created by the data filtering and noise reduction module comprises a structured prediction table.

13. The method of claim 12, wherein input data is removed if a latent semantic index value of the negative query matrix is greater than zero and a latent semantic index value of the positive query matrix is equal to zero.

14. A non-transitory, computer readable medium having executable instructions stored therein, the medium comprising:
   instructions to receive input data at a computer processor of a data filtering and noise reduction module;

instructions to access a data filter dictionary, wherein the data filter dictionary stores a plurality of electronic log data records associated with prior input data;

instructions to utilize data from the data filter dictionary and a latent semantic indexing data filter and noise reduction algorithm to remove information from the input data and create a subset of the input data;

instructions to receive the subset of the input data at a predictive analytic algorithm platform;

instructions to use, by the predictive analytic algorithm platform, a predictive analytic algorithm, associated with an in-memory database system and a predictive analysis library, and the subset of the input data to output a prediction result;

instructions to receive, at an intelligent loop-back mechanism, the subset of the input data; and instructions to dynamically update, by the intelligent loop-back mechanism, the data filter dictionary based on an impact associated with the output prediction result.

15. The medium of claim 14, wherein the latent semantic indexing data filter and noise reduction algorithm is associated with a positive query matrix and a negative query matrix.

16. The medium of claim 15, wherein the subset of data of the input data created by the data filtering and noise reduction module comprises a structured prediction table.

17. The medium of claim 16, wherein input data is removed if a latent semantic index value of the negative query matrix is greater than zero and a latent semantic index value of the positive query matrix is equal to zero.

18. The medium of claim 14, wherein the input data comprises a set of documents and the latent semantic indexing is associated with at least one of: (i) a complete list of all words that appear in the input data, (ii) discarding articles, prepositions, and conjunctions, (iii) discarding common verbs, (iv) discarding pronouns, (v) discarding common adjectives, (vi) discarding frilly words, (vii) discarding any words that appear in every document, and (viii) discarding any words that appear in only one document.

* * * * *